(12) United States Patent
Kim et al.

(10) Patent No.: US 6,817,210 B1
(45) Date of Patent: Nov. 16, 2004

(54) ABSORPTIVE HIGH TEMPERATURE DESORBER HAVING MECHANICALLY NARROW WIDTH OF COMBUSTION AREA AND ABSORPTION CHILLER-HEATER USING THE SAME

(75) Inventors: Ig Saeng Kim, Chungcheongnam-do (KR); Kyun Seok Kim, Gyeonggi-do (KR); Do Hyung Kim, Gyeonggi-do (KR); Chun Dong Kim, Gyeonggi-do (KR); Chang Ho Lee, Gyeonggi-do (KR)

(73) Assignee: L G Cable LTD, Seoul (KR)

( * ) Notice: Subject to any disclaimer, the term of this patent is extended or adjusted under 35 U.S.C. 154(b) by 0 days.

(21) Appl. No.: 10/681,717

(22) Filed: Oct. 8, 2003

(30) Foreign Application Priority Data

Oct. 10, 2002 (KR) .................. 10-2002-0061707

(51) Int. Cl.$^7$ .............................................. F25B 33/00
(52) U.S. Cl. ............................ 62/497; 62/101; 62/476; 62/489
(58) Field of Search .................. 62/476, 485, 487, 62/489, 483, 497, 498, 141, 101

(56) References Cited

U.S. PATENT DOCUMENTS

| | | | | |
|---|---|---|---|---|
| 4,902,207 A | * | 2/1990 | Hembree et al. | ........... 417/403 |
| 5,097,676 A | * | 3/1992 | Erickson | ...................... 62/476 |
| 5,271,246 A | | 12/1993 | Yamauchi | |
| 6,038,882 A | | 3/2000 | Kuroda et al. | |
| 6,393,863 B1 | | 5/2002 | Nakajima et al. | |
| 6,487,875 B1 | * | 12/2002 | Sarkisian et al. | ............. 62/497 |
| 6,550,272 B2 | | 4/2003 | Nakajima et al. | |

* cited by examiner

Primary Examiner—Melvin Jones
(74) Attorney, Agent, or Firm—Thomas R. FitzGerald, Esq.

(57) ABSTRACT

The present invention relates an absorptive high temperature desorber for mechanically narrowing the width of the combustion area, and an absorption chiller-heater using the absorptive high temperature desorber. The high temperature desorber comprises a plurality of combustion chambers, a group of liquid ducts arranged in the perpendicular direction in the combustion chambers, and the distribution chambers independently supplying a mixing gas to the plurality of combustion chambers. Therefore, the high temperature desorber can form flame independently and variably in the combustion chamber, and has a mechanically small width.

16 Claims, 7 Drawing Sheets

ABSORPTIVE HIGH TEMPERATURE DESORBER HAVING MECHANICALLY NARROW WIDTH OF COMBUSTION AREA AND ABSORPTION CHILLER-HEATER USING THE SAME

CROSS-REFERENCE TO RELATED APPLICATIONS

This application claims the benefit of the filing date of Korean Patent Application Number 2002-0061707, filed Oct. 0, 2002.

BACKGROUND OF THE INVENTION

1. Field of the Invention

This invention relates to a high temperature desorber of an absorption chiller-heater, and particularly to a high temperature desorber having a high thermal efficiency by efficiently distributing a mixing gas although having a small total size due to a relatively narrow width, and an absorption chiller-heater using the same.

2. Description of the Background Art

Generally, a chiller-heater is a device for controlling a temperature of the outside load cycled by the second water, the temperature of which is changed by a first water as heat of the first water exchanges with that of the second water. Here, the temperature and state of the first water are changed by burning a mixing gas through a high temperature desorber equipped in the chiller-heater. The first water exchanges heat with the second water by any other constitutional elements. A prior art high temperature desorber will be specifically explained hereinafter.

Figure 1:
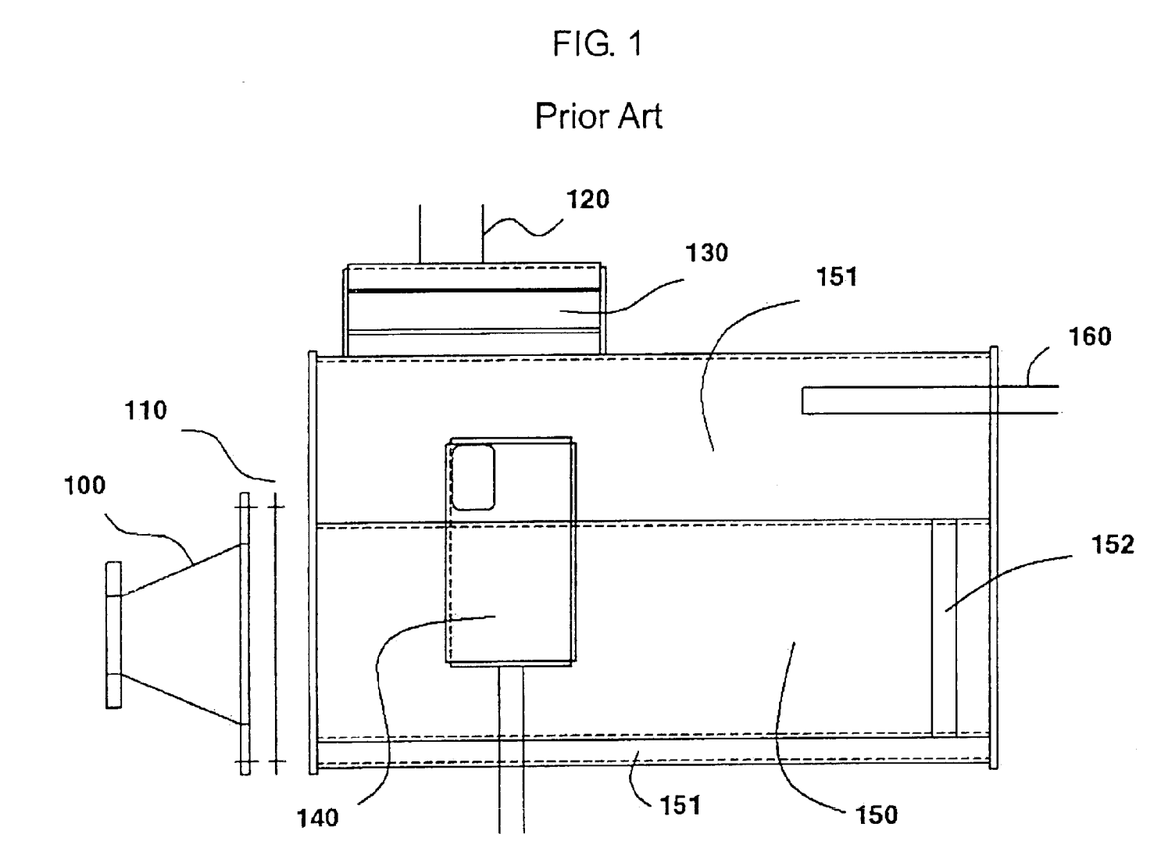
FIG. 1 is an elevation view of an absorptive high temperature desorber having a one stage type liquid duct according to the prior art.
Figure 2:
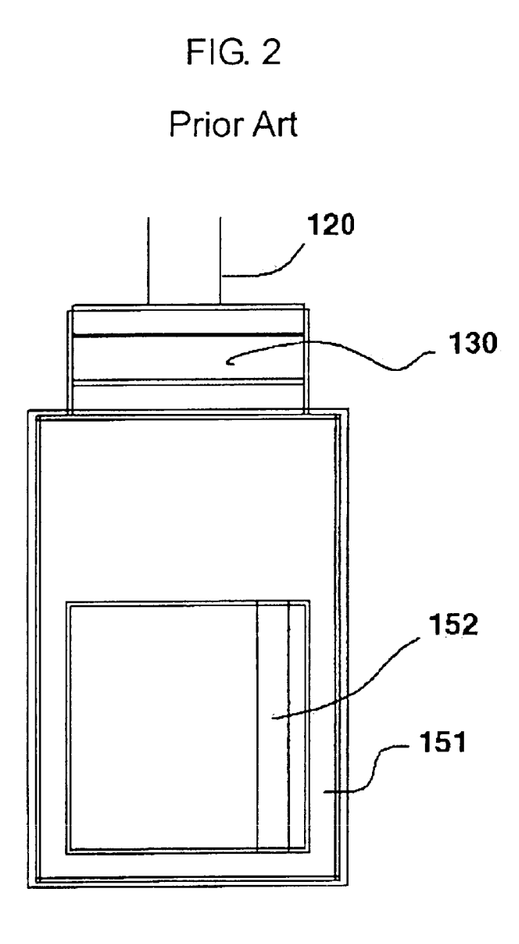
FIG. 2 is a side view of FIG. 1.
Figure 3:
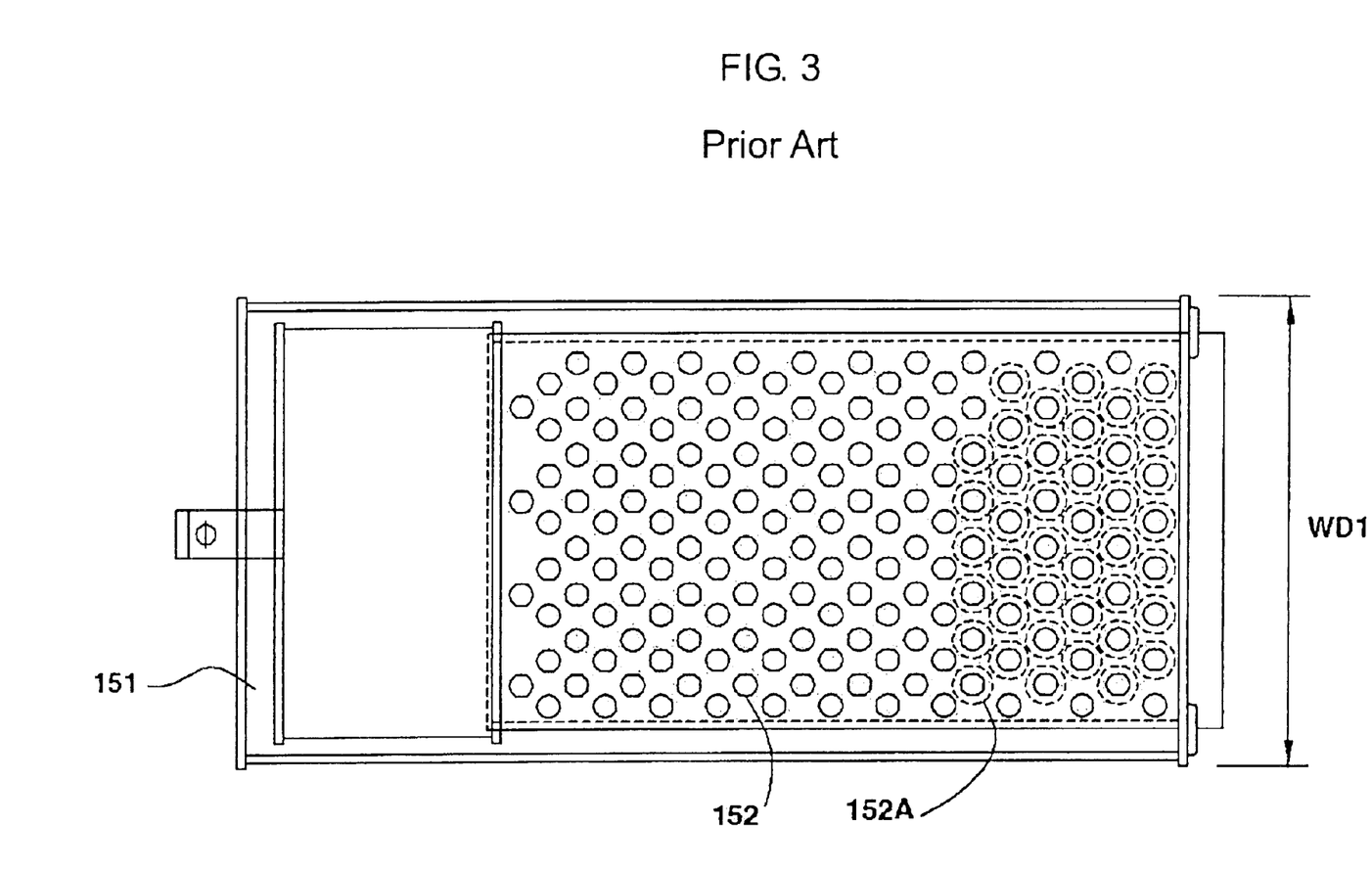
FIG. 3 is an elevation view in section of FIG. 1.

FIG. 1 is an elevation view of an absorptive high temperature desorber having a one-end type liquid duct according to the prior art, FIG. 2 is a side view of FIG. 1, and FIG. 3 is an elevation view in section of FIG. 1.

As shown in FIGS. 1 to 3, the prior art absorptive high temperature desorber comprises a mixing gas chamber 100 including a mixing gas consisting of fuel and air, a combustion chamber 150 receiving the mixing gas and forming flame, a combustion plate 110 equipped between the mixing gas chamber 110 and the combustion chamber 150 for forming flame in the combustion chamber, a diluted solution input end 160 receiving a diluted solution, a duct wall 151 forming a wall of the combustion chamber 150, the intermediate solution flowing on the duct wall, a group of liquid duct 152 equipped in the perpendicular direction within the combustion chamber, the intermediate solution flowing therein, a vapor discharging end 120 discharging vapor separated from the diluted solution by flame formed in the combustion chamber, an eliminator 130 equipped between the vapor discharging end 120 and the duct wall 151 for preventing the intermediate solution from passing through the vapor discharging end 120, and the intermediate solution discharging end 140 discharging the intermediate solution generated by separating the moisture from the diluted solution.

The prior art high temperature desorber having the above constitution is proper when it actuates a relatively large load and does not change the load with a temperature having a large width.

However, since the prior art high temperature desorber does not properly correspond in case that a large load needs a small range of the temperature change, and also the combustion range has a minimum limitation, the chiller-heater is operated within the minimum limitation. For example, in case that a temperature changes with a relatively large range according to the weather, the daytime and the nighttime, the absorptive high temperature desorber also properly actuates the load according to the temperature. However, the high temperature desorber having the minimum limitation does not operate properly. The operating efficiency and the safety of the high temperature desorber fall easily in case that the temperature changes frequently and the range of the change thereof is large. Therefore, in order to overcome the minimum limitation of the combustion range and the frequent temperature change, several expensive absorption chiller-heater is equipped. For example, the chiller-heater having a capacity of 200 RT and the chiller-heater having a capacity of 100 RT must be equipped.

Further, since the high temperature desorber equipped next to the absorption chiller-heater has a relatively large width WD1, the width of the absorption chiller-heater is not only larger, but also the total size of the absorption chiller-heater is bigger.

BRIEF SUMMARY OF THE INVENTION

It is, therefore, an object of the invention to provide an absorptive high temperature desorber for reducing the limitation of the combustion and mechanically narrowing the width of the combustion area, and an absorption chiller-heater using the absorptive high temperature desorber.

To accomplish the above object, an absorptive high temperature desorber according to the invention comprises a plurality of combustion chambers receiving a mixing gas consisting of fuel and air for forming name; a plurality of distribution chambers supplying the mixing gas correspondingly adjacent to the respective combustion chamber; combustion plates equipped between the respective combustion chamber and the respective distribution chamber, the combustion plates igniting the mixing gas independently flowing from the respective distribution chamber to the respective combustion chamber for forming flame; a diluted solution input section 56B receiving a diluted solution such as lithium bromide from an outside; a group of liquid duct having a predetermined diameter, the group of liquid duct being equipped in the perpendicular direction within the respective combustion chamber, the intermediate solution flowing therein; a duct wall forming a wall of the combustion chamber, the intermediate solution flowing on the duct wall; a group of liquid ducts equipped in the perpendicular direction within the combustion chambers the intermediate solution flowing therein; a vapor discharging section discharging the vapor evaporated from the diluted solution into the outside, the intermediate solution flowing within the group of liquid duct and on the duct wall being heated by the flame; and an intermediate solution discharging section discharging the intermediate solution generated by evaporating the vapor from the diluted solution into the outside.

Further, an absorption chiller-heater according to the invention comprises a diluted solution generating section connected to the outside load for exchanging heat with the outside load, the diluted solution generating section generating the diluted solution by evaporating a moisture in a diluted solution such as lithium bromide; an intermediate solution generating section discharging vapor evaporated from the diluted solution and the intermediate solution having a higher concentration than that of the diluted solution by receiving the diluted solution discharged from the diluted solution generating section and evaporating a moisture contained in the diluted solution; and a concentrated solution generating section discharging the concentrated solution having a higher concentration than that of the intermediate solution and water generated by condensing water vapor transferring heat to the concentrated solution to the diluted solution generating section by receiving the intermediate solution and water vapor and evaporating a moisture contained in the intermediate solution by a thermal energy contained in the water vapor of high temperature

DETAILED DESCRIPTION OF THE INVENTION

Figure 4A:
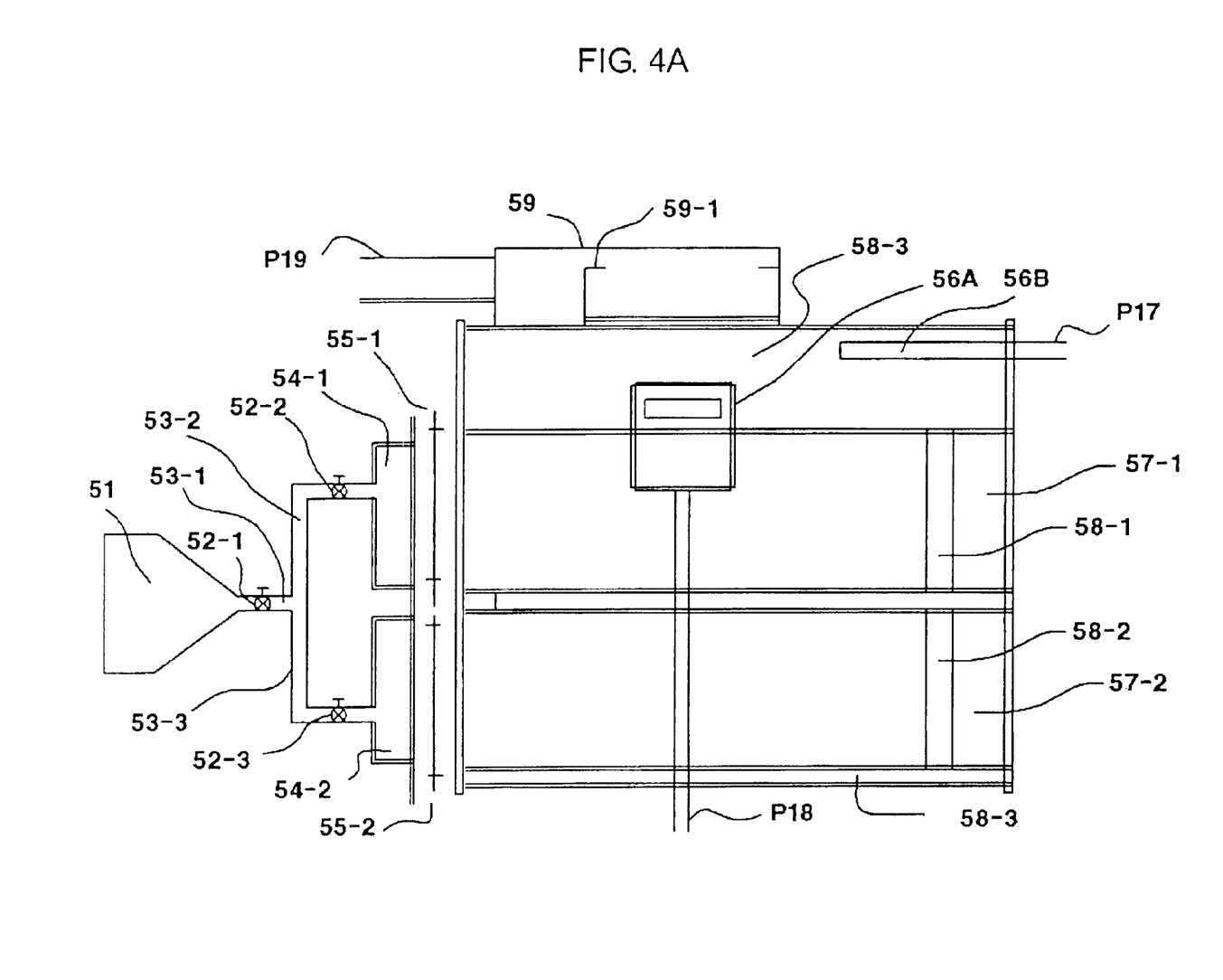
FIG. 4A is an elevation view of an absorptive high temperature desorber having a narrow width according to the present invention.
Figure 4B:
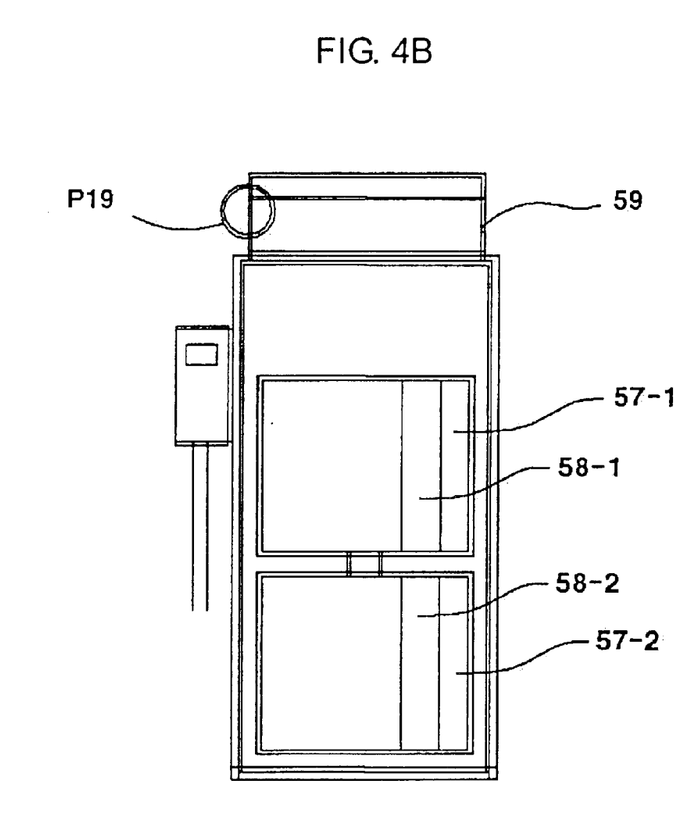
FIG. 4B is a side view of FIG. 4A.
Figure 4C:
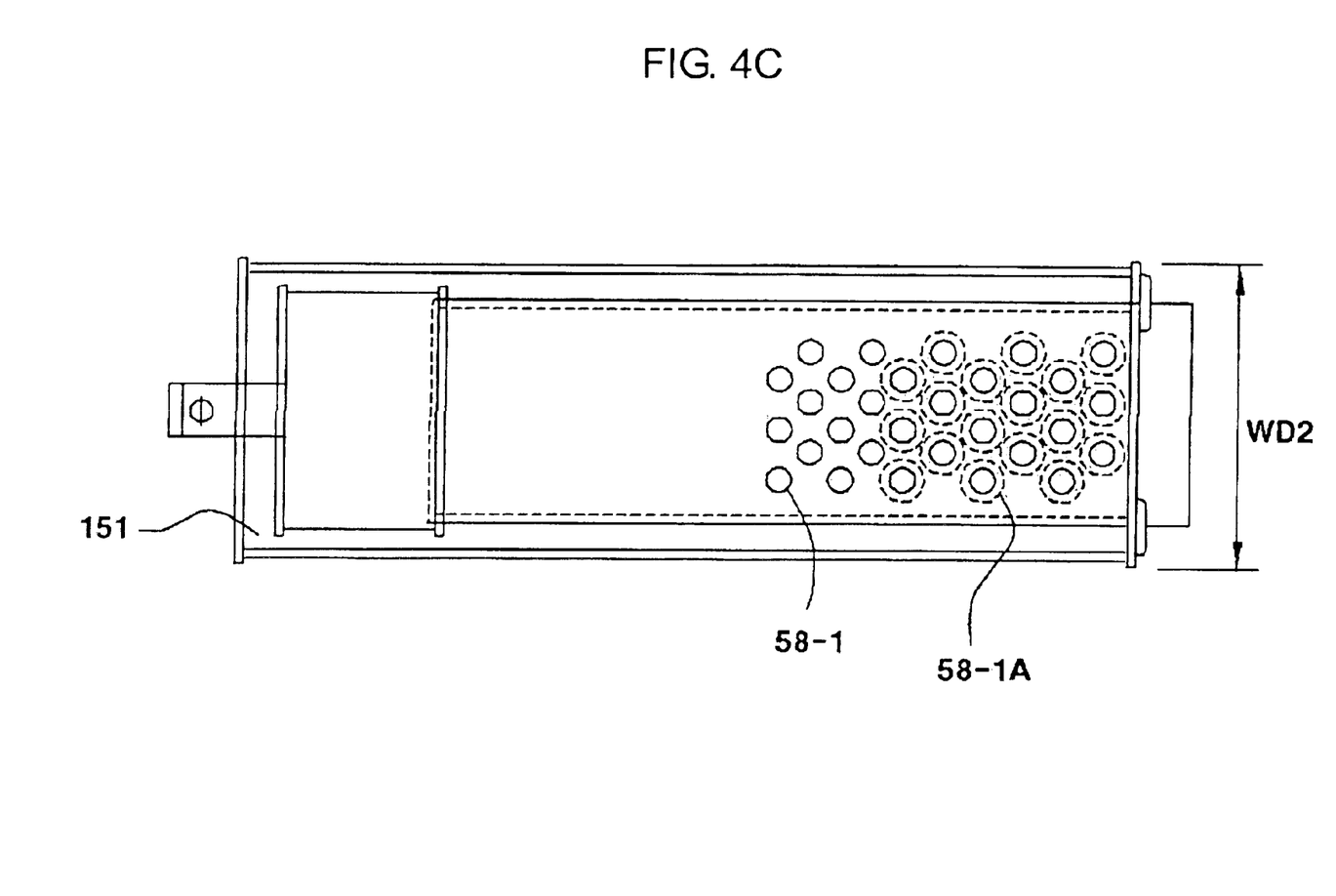
FIG. 4C is an elevation view in section of FIG. 4A.

FIG. 4A is an elevation view of an absorptive high temperature desorber having a narrow width according to the present invention, FIG. 4B is a side view of FIG. 4A, and FIG. 4C is an elevation view in section of FIG. 4A.

Referring to FIGS. 4A to 4C, an absorptive high temperature desorber 50 according to the present invention comprises distribution chambers 54-1, 54-2 including a mixing gas transferred from a mixing gas chamber 51 forming a mixing gas with fuel and air, branch pipes 53-1, 53-2, 53-3 transferring the mixing gas from the mixing gas chamber 51 to the distribution chambers 54-1, 54-2, combustion chambers 57-1, 57-2 receiving the mixing gas from the distribution chambers 54-1, 54-2 for forming flame, combustion plates 55-1, 55-2 equipped between the distribution chambers 54-1, 54-2 and the combustion chambers 57-1, 57-2 for forming flame toward the respective combustion chamber, a diluted solution input section 56B receiving the diluted solution through a port P17, a duct wall 58-3 forming the wall of the combustion chambers 57-1, 57-2, the intermediate solution flowing therein, a group of liquid ducts 58-1, 58-2 equipped in the perpendicular direction within the combustion chambers 57-1, 57-2, the Intermediate solution flowing therein, a vapor discharging section 59 equipped adjacent to the duct wall 58-3 for discharging the water vapor separated from the diluted solution by the flame formed in the combustion chamber to the outside through the port P19, an eliminator 59-1 equipped within the vapor discharging section 59 for preventing water generated by condensing vapor from passing through the port P19, and an intermediate solution discharging section 56A discharging the intermediate solution generated by separating a moisture from the diluted solution to the outside through a port P18. Here, the branch pipes 53-1, 53-2, 53-3 are provided with valves 52-1, 52-2, 52-3 controlling an amount of the mixing gas flown from the mixing gas chamber 60 to the distribution chambers 54-1, 54-2.

The eliminator 59-1 is mechanically manufactured in the angled shape to drop the intermediate solution erupted in the perpendicular upward direction from the group of the liquid ducts or the duct wall therein.

Meanwhile, referring to FIG. 4C, the absorptive high temperature desorber has a relatively small width WD2. Here, since the group of liquid ducts 58-1 includes fins 58-1A around the respective duct thereof, they receive efficiently heat from the flame formed in the combustion chamber. Here, the group of liquid ducts 58-1 is positioned to cross each other for efficiently receiving heat from the flame.

Although the group of liquid ducts shown in FIG. 4 includes the group of liquid ducts having fins and the group of liquid ducts not having fins, all of the group of liquid ducts may have fins. FIG. 4C shows the group of liquid is ducts divided into the group of liquid ducts having fins and the group of liquid ducts not having fins merely to show the exact positions of the group of liquid ducts.

Since the absorptive high temperature desorber having the above constitution is formed with two combustion chambers against the perpendicular direction and the group of liquid ducts and the duct wall of the respective combustion chamber, it receives heat received from the flame relatively efficiently, thereby being manufactured to have mechanically a smaller width.

Figure 5:
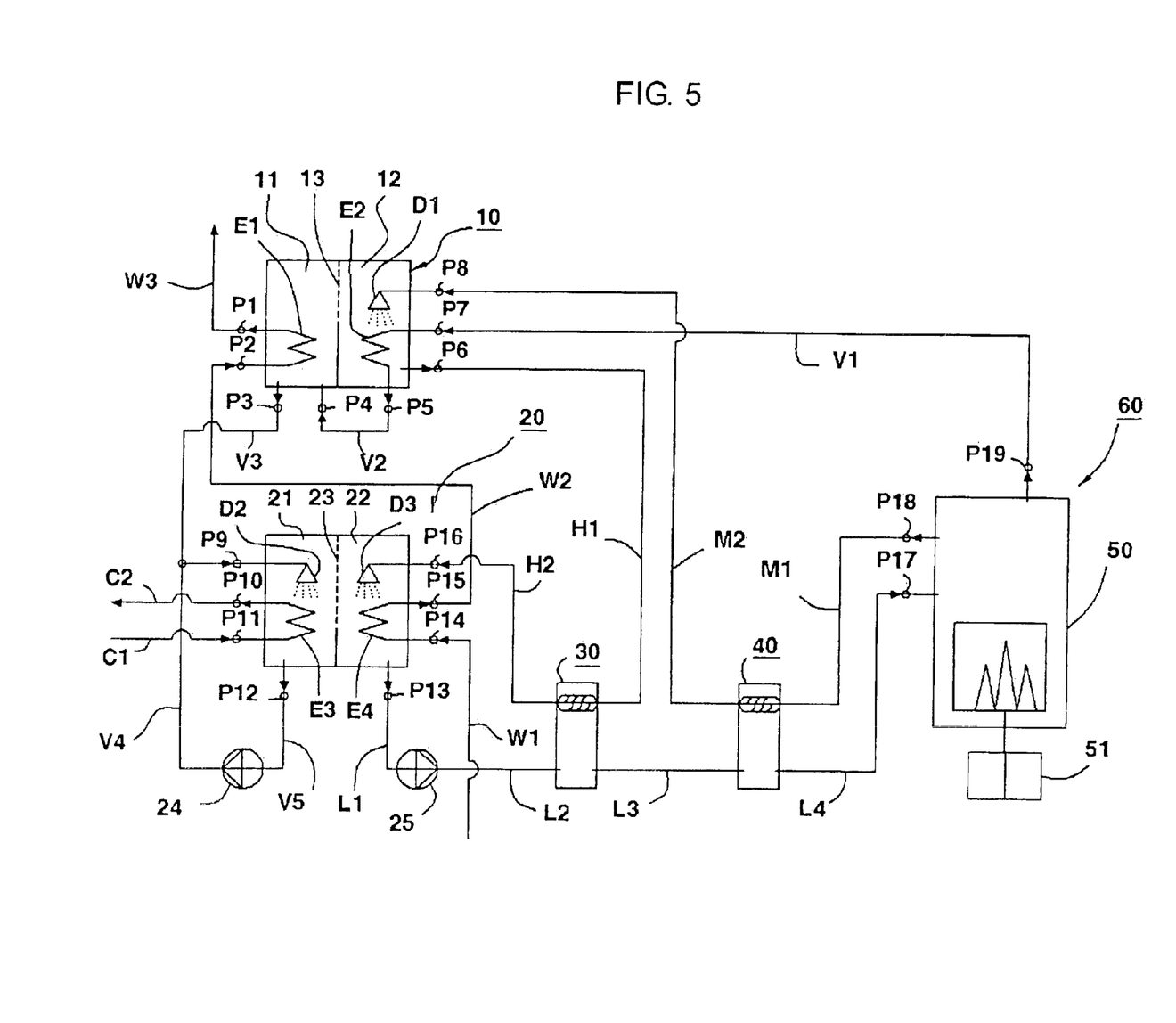
FIG. 5 is a constitutional view of an absorption chiller-heater provided with a high temperature desorber according to the present invention.

The operating method of the absorptive high temperature desorber and the operating method of the absorption chiller-heater as shown in FIG. 5 will be given herein below.

To begin with, FIG. 5 is a constitutional view of an absorption chiller-heater according to the present invention. The absorption chiller-heater comprises a diluted solution generating section 20 connected to the outside load for exchanging heat with the outside load, the diluted solution generating section generating the diluted solution by evaporating moisture in a diluted solution such as lithium bromide, an intermediate solution generating section 60 discharging vapor evaporated from the diluted solution and the intermediate solution having a higher concentration than that of the diluted solution by receiving the diluted solution discharged from the diluted solution generating section 20 and evaporating a moisture contained in the diluted solution; and a concentrated solution generating section 10 discharging the concentrated solution having a higher concentration than that of the intermediate solution and water generated by condensing water vapor transferring heat to the concentrated solution to the diluted solution generating section 20 by receiving the intermediate solution and water vapor and evaporating a moisture contained in the intermediate solution by a thermal energy contained In the water vapor of high temperature.

Further, the absorption chiller-heater further includes a low temperature heat exchanger 30 receiving the diluted solution discharged from the diluted solution generating section 20 and the concentrated solution discharged from the concentrated solution generating section 10, and discharging heat after exchanging a thermal energy of the diluted solution with a thermal energy of the concentrated solution. Further, the chiller-heater further includes a high temperature heat exchanger 40 receiving the diluted solution passed through the low temperature heat exchanger and the intermediate solution discharged from the high temperature desorber, and discharging heat after exchanging a thermal energy of the diluted solution with a thermal energy of the intermediate solution.

The respective element will be given specifically herein below.

The diluted solution generating section 20 includes an absorbing part 22 discharging a diluted solution of a lithium bromide having a low concentration by containing a vapor transformed from a water discharged from the concentrated solution generating section 10 in the concentrated solution, an evaporating part 21 receiving a water discharged from the concentrated solution generating section 10, the thermal energy of the water exchanging heat with the thermal energy of the water circulating the load, thereby generating a vapor, and a membrane 23 equipped between the absorbing part 22 and the evaporating part 21 for passing the water vapor generated from the evaporating part 21 to the absorbing part 22.

Here, the absorbing part 22 is consisted of an absorber E4, after extending the passing length and time of a coolant received from the outside through a port 14 connected to a cooling duct W1, discharging the coolant, and a spreader D3 receiving the concentrated solution discharged from the low temperature heat exchange E4 through a port 16 and spreading the concentrated solution to the absorber E4. The evaporating part 21 is consisted of an evaporator E3 receiving a load-circling water circulating the outside load through a port P11 connected to the outside load and resending the load-circling water to the load through a port P10 after extending a passing length and time of the load-circling water, and a spreader D2 receiving a water discharged from the concentrated solution generating section 10 through a port P9 and spreading the water to the evaporator E3.

Meanwhile, the absorbing part 22 is connected to a pump 25. The pump 25 receives the diluted solution discharged from a port P13 through a duct L1, and forces to send the diluted solution to the low temperature heat exchanger 30. Further, the evaporating part is connected to a pump 24. The pump 24 receives water discharged from a port P12 through a duct V5, and forces to discharge the water through a duct V4, thereby transferring the discharged water and water discharged from the concentrated solution generating section 10 to the spreader D2 through a port P9.

The intermediate solution generating section 60 includes the high temperature desorber 50 in FIGS. 4A to 4C and a mixing gas chamber 51 supplying the mixing gas to the high temperature desorber.

The concentrated solution generating section 10 includes a low temperature desorber 12 evaporating moisture from the intermediate solution for generating the concentrated solution, a condensing part 11 condensing water vapor generated from the low temperature desorber, and a membrane 13 equipped between the low temperature desorber 12 and the condensing part 11 for passing the water vapor generated from the low temperature desorber 12 to the absorbing part.

Here, the low temperature desorber 12 is consisted of a heater E2 receiving water vapor through a port P7 connected to a duct V1 into which vapor discharged form the high temperature desorber 50 flows and discharging the water vapor through a port P5 after extending a passing length and time of the water vapor, and a spreader D1 receives the intermediate solution through a port P8 connected to a duct M2 into which the intermediate solution discharged from the high temperature heat exchanger 40 flows and spreading the intermediate solution to the heater E2. Further, the condensing part 11 is consisted of a condenser E1 receiving a coolant through a port P2 connected to a duct W2 into which the coolant discharged from the absorbing part 22 flows and discharging the coolant to the outside through a port P1 after extending a passing length and time of the coolant. The condensing part 11 unites the water generated by the water vapor passed through the membrane 13 condensed in the condenser E1 with the water flown into a port P4 through a duct V2 connected to a port P5 of the low temperature desorber, and discharges the united water to the evaporating part 21 through a port P3.

The operating method of the absorption chiller-heater will be given herein below.

If the valves 52-1, 52-2, 52-3 are adjusted to operate the absorption chiller-heater connected to a predetermined load, the mixing gas within the mixing gas chamber 51 enters the distribution chambers 54-1, 54-2 through the branch pipes 53-1, 53-2, 53-3. The mixing gas entering the distribution chamber enters the combustion chambers 55-1, 55-2 through the combustion plates 55-1, 55-2. At this time, the combustion plate forms flame in the combustion chamber by igniting the mixing gas passing through.

In the high temperature desorber 50, the diluted solution discharged from the diluted solution generating section 20 and remained in the duct wall and the group of liquid ducts is heated by the flame. The heated diluted solution changes into the intermediate solution having a higher concentration than a concentration of the diluted solution with discharging water vapor. The intermediate solution having a high temperature (160° C.) is discharged into a port P18 and enters the high temperature heat exchanger 40 along a duct M1. Simultaneously, the water vapor discharged from the diluted solution is discharged into a port P19 and enters the low temperature desorber 12 along a duct V1.

In the high temperature heat exchanger 40, the intermediate solution having a high temperature (160° C.) and the diluted solution having a low temperature induced along the duct L3 from the low temperature heat exchanger exchange heat each other. The intermediate solution of the high temperature gives heat to the diluted solution of the low temperature, and changes into the intermediate solution of a low temperature (100° C.). Then, the intermediate solution enters the spreader D1 of the low temperature desorber along the duct M2. Simultaneously, the diluted solution of the low temperature gets heat from the intermediate solution of the high temperature, and changes into the diluted solution of high temperature (130° C.) higher than the prior temperature. Then, the diluted solution enters the high temperature desorber 50 along the duct L4.

In the concentrated solution generating section 10, while the water vapor of the high temperature induced along the duct V1 passes through the heater of the low temperature desorber, the intermediate solution of the low temperature induced along the duct M2 is spread into the heater E2 through the spreader D1. Then, the intermediate solution of the low temperature (100° C.) is heated by the heater, and discharges vapor to change into a concentrated solution. The concentrated solution is discharged through a port P6, and enters the low temperature heat exchanger 30 along the duct H1. Simultaneously, the water vapor evaporated from the intermediate solution by the heater E2 enters the condensing part 11 through the membrane 13. The water vapor entering the condensing part 11 is changed into water by the condenser E1. Then, the condensed water and the water formed with passing the heater E1 through the port P4 are discharged into the port P3, and then are discharged into the spreader D2 of the evaporating part 21 along the duct V3.

Meanwhile, in the low temperature heat exchanger 30, the concentrated solution of high temperature discharged from the low temperature desorber and induced along the duct H1 and the diluted solution induced along the duct L2 are exchanged heat each other. The concentrated solution of the high temperature (90° C.) soon gives heat to the diluted solution of the low temperature (40° C.), and changes into the concentrated solution of a low temperature (55° C.). Then, the concentrated solution enters the spreader D3 of the absorbing part 22 along the duct H2. Further, the diluted solution of the low temperature (40° C.) gets heat from the concentrated solution of the high temperature (90° C.), and changes into the diluted solution of high temperature (70° C.) higher than the prior temperature. Then, the diluted solution enters the high temperature heat exchanger 40 along the duct L3.

In the diluted solution generating section 20, the water spread from the spreader D2 changes into water vapor by the evaporator E3 in which the load-circling water flows, and the vapor flows into the absorbing part 22 through the membrane 23. Then, in the absorbing part, while the coolant induced through the port 14 connected to the duct W1 is discharged to the port P15 through the absorber D3, the concentrated solution of the low temperature induced through the port P16 connected to the duct H2 is spread into the absorber D3, and then the spread concentrated solution changes into the diluted solution by absorbing the water vapor discharged from the evaporating part. The diluted solution is discharged through the port P13, and then enters the high temperature desorber via the low temperature heat exchanger and the high temperature heat exchanger.

Therefore, according to the absorption chiller-heater, the lithium bromide diluted solution within the chiller-heater experiences the process of the concentration change of the diluted solution, the intermediate solution, the concentrated solution and the diluted solution in turn, and the process of the temperature change in the respective process of concentration change, thereby the load-circling water being maintained at the constant temperature.

Specifically, the high temperature desorber 50 is operated depending on the amount of the load connected to the chiller-heater and the kinds thereof, thereby enhancing the efficiency of the fuel and maintaining the load most suitably. For example, in case that the load is small, or the load is operated in part, the flame is formed in only one combustion chamber 57-1 or 57-2 and the diluted solution is circulated. If, depending on the size of the load, the valves 52-1, 52-2, 52-2 quipped in the branch pipes 53-1, 53-2, 53-3 are adjusted to adjust the amount of the mixing gas entering the distribution chambers 54-1, 54-2, the size of the flame formed in the combustion chamber is adjusted according to the adjustment.

According to circumstances, if any one valve 52-2 or 52-3 is completely closed not to inject the mixing gas to the any one distribution chamber, the flame is formed in only any one combustion chamber 57-2 or 57-3. Therefore, the flame is independently formed in the combustion chamber, and also the size of the flame is possible to be adjusted. Further, in the combustion chamber in which the flame is formed, the diluted solution included in the duct equipped in the vicinity of the combustion chamber and within the combustion chamber is heated, and then the intermediate solution is generated.

Therefore, the absorptive high temperature desorber having independently adjustable valves according to the amount of the load and the kinds thereof and variably operable combustion chambers can reduce the amount of the minimum combustion range by 50%.

Further, the mechanical width of the absorptive high temperature desorber according to the invention is decreased by about 62% compared with the width of the prior 50 RT one-end liquid duct typed absorptive high temperature desorber. Substantially, although the width of the prior 50 RT one-end liquid duct typed absorptive high temperature desorber is 520 mm, the width of the absorptive high temperature desorber according to the invention is 321 mm.

Further, the mechanical width of the absorptive high temperature desorber according to the invention Is decreased by about 58% compared with the width of 556 mm of the prior 50 RT two-end liquid duct typed absorptive high temperature desorber.

Therefore, the size of the absorption chiller-heater is decreased by about 86% compared with the size of the prior one-end typed high temperature desorber, and is decreases by about 84% compared with the size of the prior two-end typed high temperature desorber.

Meanwhile, since the valve 45 according to the invention can vary the combustion amount of the combustion range, the minimum load can be reduced by 50% by the valve.

Although the embodiment of the invention is embodies with two distribution chambers, three or more distribution chambers may be adopted, and also the number of the combustion chamber corresponding the number of the distribution chamber may be increased.

Further, although the embodiment of the invention is embodied with one sheet of the combustion plate, several combustion plates may be embodied to be folded among others.

Further, although the embodiment of the invention is embodied so that the valves 52-1, 52-2, 52-2 corresponding to the branch pipes 53-1, 53-2, 53-3 are comprised to the respective branch pipes, it may be embodied so that the valve 52-1 equipped in the branch pipe 53-1 is not comprised.

What is claimed is:

1. An absorptive high temperature desorber having a mechanically narrow width of a combustion area, comprising:

a plurality of combustion chambers (57-1, 57-2) receiving a mixing gas consisting of fuel and air for forming flame;

a plurality of distribution chambers (54-1, 54-2) supplying the mixing gas correspondingly adjacent to the respective combustion chamber;

combustion plates (55-1, 55-2) equipped between the respective combustion chamber and the respective distribution chamber, the combustion plates igniting the mixing gas independently flowing from the respective distribution chamber to the respective combustion chamber for forming flame;

a diluted solution input section (56B) receiving a diluted solution such as lithium bromide from an outside;

a group of liquid duct having a predetermined diameter, the group of liquid duct being equipped in the perpendicular direction within the respective combustion chamber, the intermediate solution flowing therein;

a duct wall (58-3) forming a wall of the combustion chamber, the intermediate solution flowing on the duct wall;

a group of liquid ducts (58-1, 58-2) equipped in the perpendicular direction within the combustion chambers (57-1, 57-2), the intermediate solution flowing therein;

a vapor discharging section (59) discharging the vapor evaporated from the diluted solution into the outside, the intermediate solution flowing within the group of liquid duct and on the duct wall being heated by the flame; and an intermediate solution discharging section (56A) discharging into the intermediate solution generated by evaporating the vapor from the diluted solution the outside.

2. The absorptive high temperature desorber according to claim 1, wherein the vapor discharging section (59) further includes an eliminator (59-1) having an angled shape for preventing the intermediate solution from erupting and discharging toward the outside.

3. The absorptive high temperature desorber according to claim 1, wherein the plurality of distribution chambers further include a first branch pipe (53-1) equipped in the outside, the first branch pipe being connected with a mixing gas chamber generating the mixing gas; and a plurality of second branch pipes (53-2, 53-3) connected to the other end of the first branch pipe connected to the mixing gas chamber.

4. The absorptive high temperature desorber according to claim 3, wherein the second branch pipe includes a plurality of first valves for independently controlling an amount of the mixing gas flowing from the mixing gas chamber to the distribution chamber.

5. The absorptive high temperature desorber according to claim 4, wherein the first branch pipe further includes a second valve for controlling an amount of the mixing gas flowing from the mixing gas chamber to the second branch pipe.

6. The absorptive high temperature desorber according to claim 1, wherein the respective combustion plate is overlapped plurally.

7. An absorption chiller-heater comprising:
   a diluted solution generating section (20) connected to the outside load for exchanging heat with the outside load, the diluted solution generating section generating the diluted solution by containing moisture in an diluted solution such as lithium bromide;
   an intermediate solution generating section (60) discharging vapor evaporated from the diluted solution and the intermediate solution having a higher concentration than that of the diluted solution by receiving the diluted solution discharged from the diluted solution generating section (20) and evaporating a moisture contained in the diluted solution; and
   a concentrated solution generating section (10) discharging the concentrated solution having a higher concentration than that of the intermediate solution and water generated by condensing water vapor transferring heat to the concentrated solution to the diluted solution generating section (20) by receiving the intermediate solution and water vapor and evaporating a moisture contained in the intermediate solution by a thermal energy contained in the water vapor of high temperature;
   wherein, the intermediate solution generating section comprising:
      a plurality of combustion chambers (57-1, 57-2) receiving a mixing gas consisting of fuel and air for forming flame;
      a plurality of distribution chambers (54-1, 54-2) supplying the mixing gas correspondingly adjacent to the respective combustion chamber;
      combustion plates (55-1, 55-2) equipped between the respective combustion chamber and the respective distribution chamber, the combustion plates igniting the mixing gas independently flowing from the respective distribution chamber to the respective combustion chamber for forming flame;
      a diluted solution input section 56B receiving a diluted solution discharged from the diluted solution generating section;
      a group of liquid duct having a predetermined diameter, the group of liquid duct being equipped in the perpendicular direction within the respective combustion chamber, the diluted solution flowing therein;
      a duct wall (58-3) forming a wall of the combustion chamber, the diluted solution flowing on the duct wall;
      a group of liquid ducts (58-1, 58-2) equipped in the perpendicular direction within the combustion chambers (57-1, 57-2), the diluted solution flowing therein;
      a vapor discharging section (59) discharging the water vapor evaporated from the diluted solution into the diluted solution generating section, the diluted solution flown within the group of liquid duct and on the duct wall being heated by the flame; and
      an intermediate solution discharging section (56A) discharging the intermediate solution generated by evaporating the water vapor from the diluted solution into the diluted solution generating section.

8. The absorption chiller-heater according to claim 7, wherein the vapor discharging section (59) further includes an eliminator (59-1) having an angled shape for preventing the diluted solution from erupting and discharging toward the outside.

9. The absorption chiller-heater according to claim 7, wherein the plurality of distribution chambers further include a first branch pipe (53-1) equipped in the outside, the first branch pipe being connected with a mixing gas chamber generating the mixing gas; and a plurality of second branch pipes (53-2, 53-3) connected to the other end of the first branch pipe connected to the mixing gas chamber.

10. The absorption chiller-heater according to claim 9, wherein the second branch pipe includes a plurality of first valves for independently controlling an amount of the mixing gas flowing from the mixing gas chamber to the distribution chamber.

11. The absorption chiller-heater according to claim 10, wherein the first branch pipe further includes a second valve for controlling an amount of the mixing gas flowing from the mixing gas chamber to the second branch pipe.

12. The absorption chiller-heater according to claim 7, wherein the respective combustion plate is overlapped plurally.

13. The absorption chiller-heater according to claim 7, wherein the intermediate solution generating section further includes a mixing gas chamber generating the mixing gas.

14. The absorption chiller-heater according to claim 7, wherein the chiller-heater further includes a low temperature heat exchanger (30) receiving the diluted solution discharged from the diluted solution generating section (20) and the concentrated solution discharged from the concentrated solution generating section (10), and discharging heat after exchanging a thermal energy of the diluted solution with a thermal energy of the concentrated solution.

15. The absorption chiller-heater according to claim 14, wherein the chiller-heater further includes a high temperature heat exchanger (40) receiving the diluted solution passed through the low temperature heat exchanger and the intermediate solution discharged from the high temperature desorber, and discharging heat after exchanging a thermal energy of the diluted solution with a thermal energy of the intermediate solution.

16. The absorption chiller-heater according to claim 7, wherein the chiller-heater further includes a high temperature heat exchanger (40) receiving the diluted solution passed through the low temperature heat exchanger and the intermediate solution discharged from the high temperature desorber, and discharging heat after exchanging a thermal energy of the diluted solution with a thermal energy of the intermediate solution.

* * * * *